United States Patent
Yamamoto et al.

(10) Patent No.: US 6,756,717 B2
(45) Date of Patent: Jun. 29, 2004

(54) MOTOR

(75) Inventors: Toshio Yamamoto, Shizuoka-ken (JP);
Masayuki Kuwano, Shizuoka-ken (JP);
Shinji Santo, Aichi-ken (JP)

(73) Assignee: Asmo Co. Ltd., Shizuoka-ken (JP)

(*) Notice: Subject to any disclaimer, the term of this patent is extended or adjusted under 35 U.S.C. 154(b) by 0 days.

(21) Appl. No.: 10/606,384

(22) Filed: Jun. 26, 2003

(65) Prior Publication Data

US 2004/0032180 A1 Feb. 19, 2004

(30) Foreign Application Priority Data

Jun. 28, 2002 (JP) .................................. 2002-190260

(51) Int. Cl.⁷ .............................................. H01R 39/04
(52) U.S. Cl. ...................... 310/225; 310/204; 310/198; 310/234
(58) Field of Search ................................. 310/225, 198, 310/224, 234, 235, 201–208, 233

(56) References Cited

U.S. PATENT DOCUMENTS

| | | | | |
|---|---|---|---|---|
| 4,437,029 A | * | 3/1984 | Ban et al. | 310/198 |
| 4,447,751 A | * | 5/1984 | Ban et al. | 310/154.05 |
| 4,459,503 A | * | 7/1984 | Kropp et al. | 310/198 |
| 4,876,472 A | * | 10/1989 | Shiraki et al. | 310/198 |
| 5,001,375 A | * | 3/1991 | Jones | 310/68 B |
| 5,677,586 A | * | 10/1997 | Horst | 310/103 |
| 6,057,623 A | | 5/2000 | Tanaka et al. | |
| 6,236,137 B1 | | 5/2001 | Tanaka et al. | |
| 2002/0121831 A1 | | 9/2002 | Egawa et al. | |

FOREIGN PATENT DOCUMENTS

| | | |
|---|---|---|
| JP | 10-174403 | 6/1998 |
| JP | 10-341562 | 12/1998 |
| JP | 2000-60073 | 2/2000 |
| JP | 2000-60074 | 2/2000 |
| JP | 2001-275327 | 10/2001 |

* cited by examiner

Primary Examiner—Thanh Lam
(74) Attorney, Agent, or Firm—Rodman & Rodman (57) ABSTRACT

A motor includes a commutator, which has twenty-four segments. Each of eight short-circuit members is connected to three of the segments. Each short-circuit member extends in an arcuate form in an angular range corresponding to arranging positions of three segments to be connected to the short-circuit member. The eight short-circuit members are laminated to form a multiple-layer structure in the axial direction of the commutator. The short-circuit members form a substantially cylindrical laminated body. The short-circuit members are formed and arranged such that the number of the layers of the laminated body is less than the number of the short-circuit members. As a result, the axial dimension of the laminated body is reduced and the miniaturization of the motor in the axial direction is achieved.

17 Claims, 5 Drawing Sheets

MOTOR

BACKGROUND OF THE INVENTION

The present invention relates to a motor. More particularly, the present invention pertains to a motor that has short-circuit members for connecting segments of a commutator.

Japanese Laid-Open Patent Publication No. 10-174403 discloses a motor that has a stator and a rotor (armature). The stator has permanent magnets, which form magnetic poles. The armature has exciting coils. The armature is rotated when electric current is supplied to the exciting coils through an anode supply brush and a cathode supply brush.

U.S. Laid-Open Patent Publication No. 2002/0121831A1 discloses a motor that includes a stator and a rotor (armature). The stator has permanent magnets that form six magnetic poles. The armature has eight exciting coils. The force applied to the armature in the radial direction during rotation is very small. Therefore, vibration of the armature is very small.

In the above mentioned motor, the commutator has twenty-four segments arranged along the outer circumferential surface of the commutator. Three anode supply brushes and three cathode supply brushes slide against the commutator. That is, the total number of the supply brushes is six. However, with this structure, a process for assembling a brush device is not only complicated, but also increases the size of the brush device since there are many supply brushes.

Accordingly, it has been proposed to reduce the number of supply brushes by connecting some of the segments of the commutator that have the same potential.

Short-circuit members are used to connect the segments. However, although the short-circuit members are effective in reducing the number of the supply brushes, the short-circuit members can increase the size of the motor. Therefore, it is desired to design and arrange the short-circuit members without increasing the size of the motor.

SUMMARY OF THE INVENTION

Accordingly, it is an objective of the present invention to reduce the size, particularly the axial size, of a motor that includes short-circuit members.

To achieve the above objective, the present invention provides a motor, which includes a stator, a rotor, an anode supply brush, and a cathode supply brush. The stator has a plurality of magnetic poles. The number of the magnetic poles is represented by 2x (x is an integer number greater than or equal to one). The magnetic poles are arranged along the circumferential direction of the stator. The rotor faces the magnetic poles. The rotor includes an armature core, a commutator, and short-circuit members. The armature core has a plurality of teeth. The number of the teeth is represented by 2y (y is an integer number greater than or equal to three). A coil is wound about each tooth. The commutator has a plurality of segments. The number of the segments is represented by 2xy. The segments are arranged along the circumferential direction of the commutator. Each short-circuit member is connected to a predetermined number of the segments. The number of the segments that are connected to one short-circuit member is B. The number of the short-circuit members is at least 2xy/B. The anode supply brush and the cathode supply brush slide against the commutator. The supply brushes are arranged at a predetermined angular interval about the axis of the commutator. Each short-circuit member extends in an arcuate form in an angular range corresponding to the arranging positions of the segments to be connected to the short-circuit member. The short-circuit members are laminated to form a multilayer structure in the axial direction of the commutator, and form a substantially cylindrical laminated body. The short-circuit members are formed and arranged such that at least parts of two or more of the short-circuit members are in the same layer of the laminated body so that the number of layers of the laminated body is less than the number of short-circuit members.

The present invention also provides a motor, which includes a stator, a rotor, an anode supply brush, and a cathode supply brush. The stator has six magnetic poles. The magnetic poles are arranged along one circumferential direction of the stator. The magnetic poles are arranged such that the magnetic poles that are adjacent to each other in the circumferential direction have different polarities. The rotor faces the magnetic poles. The rotor includes an armature core, a commutator, short-circuit members. The armature core has eight teeth. A coil is wound about each tooth. The commutator has twenty-four segments. The segments are arranged in the circumferential direction of the commutator. Each short-circuit member is connected to three of the segments. The anode supply brush and the cathode supply brush slide against the commutator. The supply brushes are arranged at an angular interval of 180 degrees about the axis of the commutator. The segments are classified into first to eighth segment groups in order along the one circumferential direction of the commutator. Each segment group includes first to third segments. Each coil is connected to the second and third segments of one of the segment groups. The short-circuit members include first short-circuit members and second short-circuit members. Each of the first short-circuit members is connected to the first segment of an odd number segment group, the third segment of an even number segment group that is adjacent to the odd number segment group in the one circumferential direction, and the third segment of an odd number segment group that is adjacent to the even number segment group in the one circumferential direction. Each of the second short-circuit members is connected to the first segment of an even number segment group, the second segment of an odd number segment group that is adjacent to the even number segment group in the one circumferential direction, and the second segment of an even number segment group that is adjacent to the odd number segment group in the one circumferential direction.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1(a) to 3(b).

Figure 1:
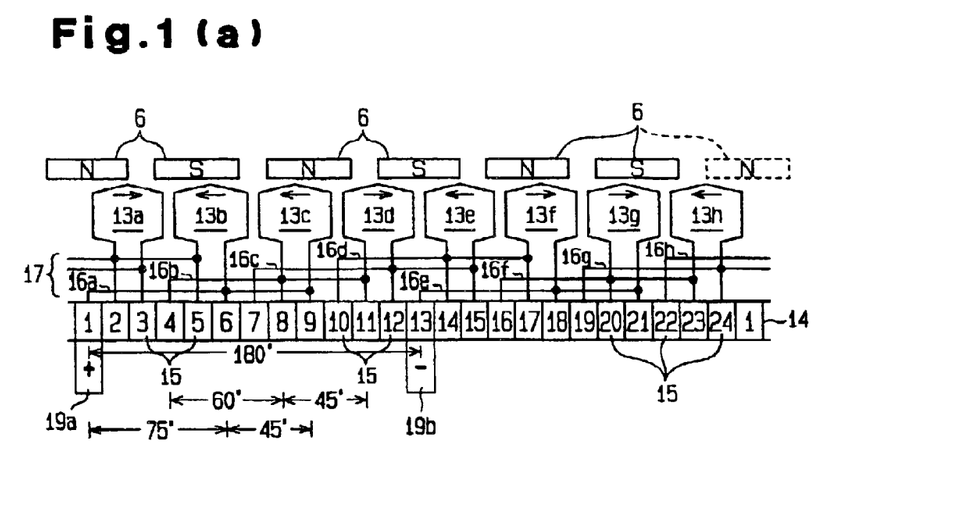
FIG. 1(a) is an exploded diagram illustrating a motor according to a first embodiment of the present invention.
FIG. 1(b) is schematics illustrating exciting coils of the motor shown in FIG. 1(a)
Figure 2:
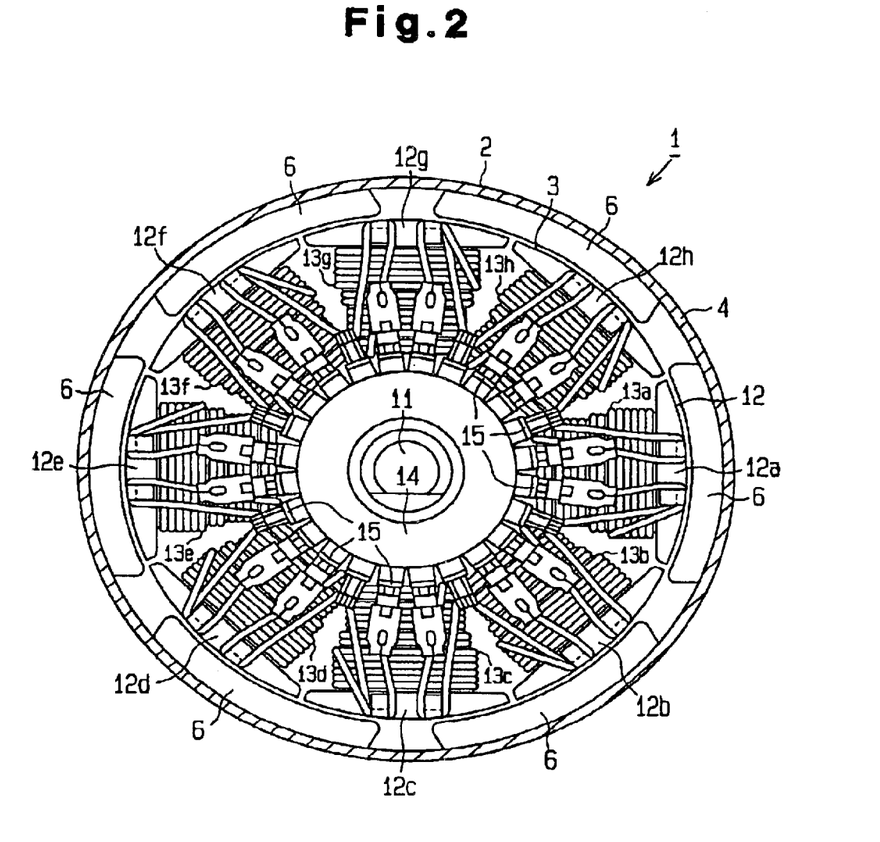
FIG. 2 is a cross-sectional view illustrating the motor shown in FIG. 1.
Figure 3A:
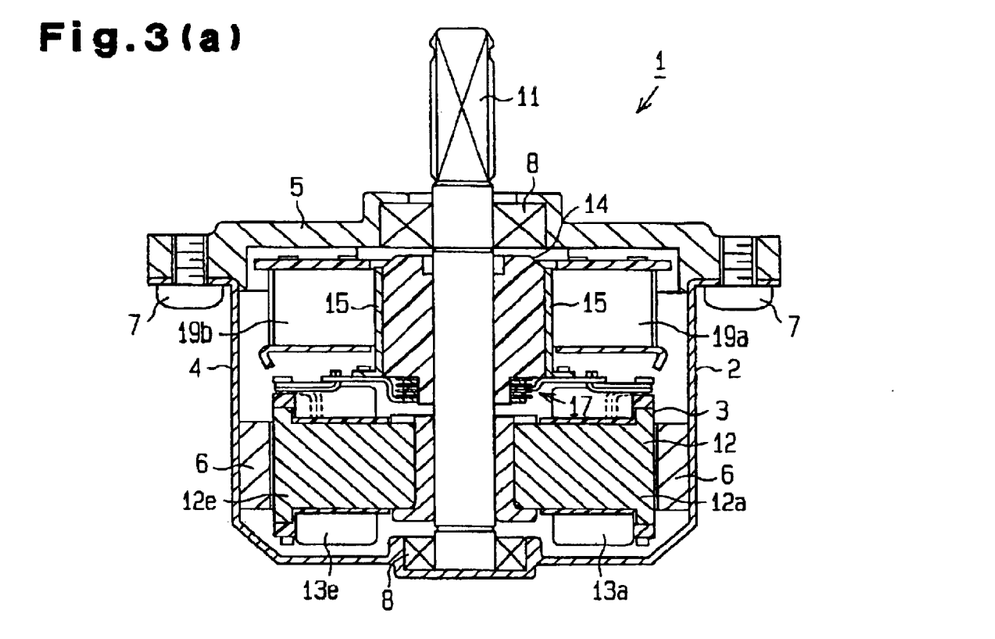
FIG. 3(a) is a cross-sectional view illustrating the motor shown in FIG. 1.

FIGS. 2 and 3(a) illustrate a motor 1 according to the first embodiment. The motor 1 is a direct current motor. The motor 1 includes a stator 2 and a rotor, which is an armature 3. The stator 2 has a yoke housing 4, an end flame 5, and six permanent magnets 6.

The yoke housing 4 is cup-shaped. The permanent magnets 6 are secured to the inner circumferential surface of the yoke housing 4. Each permanent magnet 6 has a substantially arcuate cross-section. The permanent magnets 6 are arranged at equal intervals in the circumferential direction of the yoke housing 4 such that the adjacent magnetic poles have different polarities. That is, the number of magnetic poles of the stator 2 is six. The armature 3 is accommodated in the yoke housing 4 and surrounded by the permanent magnets 6. The end flame 5 is attached to the yoke housing 4 with screws 7 such that the end flame 5 closes the opening of the yoke housing 4. A bearing 8 is retained at the center of the end flame 5 and another bearing 8 is retained at the center of the bottom of the yoke housing 4. Each bearing 8 supports a rotary shaft 11 of the armature 3.

The armature 3 has an armature core 12, exciting coils 13a to 13h, and a commutator 14 in addition to the rotary shaft 11. The armature core 12 is secured to the rotary shaft 11. The armature core 12 has eight teeth 12a to 12h, which extend in the radial direction. A coil is wound about each of the first to eighth teeth 12a to 12h by a concentrated winding. This forms first to eighth exciting coils 13a to 13h. That is, the motor 1 according to the first embodiment has eight exciting coils 13a to 13h.

The commutator 14 has twenty-four segments 15 on the outer circumferential surface of the commutator 14. In FIG. 1(a), numerals 1 to 24 are given to the segments 15 in order along the circumferential direction of the commutator 14. The No. 1 to No. 24 segments 15 are divided into eight segment groups in order from the No. 1 segment 15. Each segment group includes three segments 15. Each of the first to eighth segment groups includes first to third segments 15, which have consecutive numbers. The first to eighth segment groups correspond to the first to eighth exciting coils 13a to 13h, respectively.

For example, in FIG. 1(a), the first segment group includes No. 1, No. 2, and No. 3 segments 15 as the first to third segments 15. The second segment group includes No. 4, No. 5, and No. 6 segments 15 as the first to third segments 15. The eighth segment group includes No. 22, No. 23, and No. 24 segments 15 as the first to third segments 15. The first segments 15 of the first to eighth segment groups are No. 1, No. 4, No. 7 . . . and No. 22 segments 15. The second segments 15 of the first to eighth segment groups are No. 2, No. 5, No. 8 . . . and No. 23 segments 15. The third segments 15 of the first to eighth segment groups are No. 3, No. 6, No. 9 . . . and No. 24 segments 15. It is clear from the above explanation to which of the first to eighth segment groups each of the No. 1 to No. 24 segments 15 belongs and to which of the first to third segments in the segment group each of the No. 1 to No. 24 segments 15 corresponds.

Each of the first to eighth exciting coils 13a to 13h is connected to the second and third segments 15 of the corresponding segment group as shown in FIG. 1(a).

That is, the first exciting coil 13a, which is wound about the first teeth 12a, has a terminal connected to the No. 2 segment 15 and another terminal connected to the No. 3 segment 15. The second exciting coil 13b, which is wound about the second teeth 12b, has a terminal connected to the No. 5 segment 15 and another terminal connected to the No. 6 segment 15. The third exciting coil 13c, which is wound about the third teeth 12c, has a terminal connected to the No. 8 segment 15 and another terminal connected to the No. 9 segment 15. The fourth exciting coil 13d, which is wound about the fourth teeth 12d, has a terminal connected to the No. 11 segment 15 and another terminal connected to the No. 12 segment 15. The fifth exciting coil 13e, which is wound about the fifth teeth 12e, has a terminal connected to the No. 14 segment 15 and another terminal connected to the No. 15 segment 15. The sixth exciting coil 13f, which is wound about the sixth teeth 12f, has a terminal connected to the No. 17 segment 15 and another terminal connected to the No. 18 segment 15. The seventh exciting coil 13g, which is wound about the seventh teeth 12g, has a terminal connected to the No. 20 segment 15 and another terminal connected to the No. 21 segment 15. The eighth exciting coil 13h, which is wound about the eighth teeth 12h, has a terminal connected to the No. 23 segment 15 and another terminal connected to the No. 24 segment 15.

The segments 15 are arranged at equal angular intervals, that is, 15 degrees intervals, about the axis of the commutator 14. As shown in FIG. 1(a), three segments 15 that are apart from each other by predetermined angular intervals are connected to each other, or, in other words, short-circuited, by one of short-circuit members 16a to 16h such that the potentials of the three segments 15 become the same. The short-circuit members include first short-circuit members 16a, 16c, 16e, and 16g and second short-circuit members 16b, 16d, 16f, and 16h. Each of the first short-circuit members 16a, 16c, 16e, and 16g connects a predetermined segment 15, a middle segment 15 that is apart from the predetermined segment 15 by 75 degrees in the circumferential direction, and one of the segments 15 that is apart from the middle segment 15 by 45 degrees in the circumferential direction. Each of the second short-circuit members 16b, 16d, 16f, and 16h connects a predetermined segment 15, a middle segment 15 that is apart from the predetermined segment 15 by 60 degrees in the circumferential direction, and a segment 15 that is apart from the middle segment 15 by 45 degrees in the circumferential direction.

More specifically, the short-circuit member 16a connects the No. 1 segment 15, the No. 6 segment 15, which is apart from the No. 1 segment 15 by 75 degrees, and the No. 9 segment 15, which is apart from the No. 6 segment 15 by 45 degrees. The short-circuit member 16b connects the No. 4 segment 15, the No. 8 segment 15, which is apart from the No. 4 segment 15 by 60 degrees, and the No. 11 segment 15, which is apart from the No. 8 segment 15 by 45 degrees. The short-circuit member 16c connects the No. 7 segment 15, the No. 12 segment 15, which is apart from the No. 7 segment 15 by 75 degrees, and the No. 15 segment 15, which is apart from the No. 12 segment 15 by 45 degrees. The short-circuit member 16d connects the No. 10 segment 15, the No. 14 segment 15, which is apart from the No. 10 segment 15 by 60 degrees, and the No. 17 segment 15, which is apart from the No. 14 segment 15 by 45 degrees. The short-circuit member 16e connects the No. 13 segment 15, the No. 18 segment 15, which is apart from the No. 13 segment 15 by 75 degrees, and the No. 21 segment 15, which is apart from the No. 18 segment 15 by 45 degrees. The short-circuit member 16f connects the No. 16 segment 15, the No. 20 segment 15, which is apart from the No. 16 segment 15 by 60 degrees, and the No. 23 segment 15, which is apart from the No. 20 segment 15 by 45 degrees. The short-circuit member 16g connects the No. 19 segment 15, the No. 24 segment 15, which is apart from the No. 19 segment 15 by 75 degrees, and the No. 3 segment 15, which is apart from the No. 24 segment 15 by 45 degrees. The short-circuit member 16h connects the No. 22 segment 15, the No. 2 segment 15, which is apart from the No. 22 segment 15 by 60 degrees, and the No. 5 segment 15, which is apart from the No. 2 segment 15 by 45 degrees.

In other words, each of the first short-circuit members 16a, 16c, 16e, and 16g connects the first segment of the nth (n is an odd number) segment group, the third segment of the even number segment group that is adjacent to the nth segment group in the circumferential direction, and the third segment of the odd number segment group that is adjacent to the even number segment group in the circumferential direction. Each of the second short-circuit members 16b, 16d, 16f, and 16h connects the first segment of the mth (m is an even number) segment group, the second segment of the odd number segment group that is adjacent to the mth segment group in the circumferential direction, and the second segment of the even number segment group that is adjacent to the odd number segment group in the circumferential direction. That is, each of the first short-circuit members 16a, 16c, 16e, and 16g connects the first segment of the first segment group, the third segment of the middle segment group, and the third segment of the last segment group among three segment groups that are consecutive in the circumferential direction starting with an odd number segment group. Each of the second short-circuit members 16b, 16d, 16f, and 16h connects the first segment of the first segment group, the second segment of the middle segment group, and the second segment of the last segment group among three segment groups that are consecutive in the circumferential direction starting with an even number segment group.

As described above, each of the short-circuit members 16a to 16h connects three of the segments 15 to one another. Accordingly, the exciting coils 13a to 13h are connected in loops as shown in FIG. 1(b).

Each of the short-circuit members 16a to 16h is formed with an arcuate metal plate and extends in an angular range corresponding to the arranging position of three segments 15 to be connected. Each first short-circuit member 16a, 16c, 16e, or 16g extends in an arcuate form in an angular range of substantially 135 degrees. The angular range of 135 degrees corresponds to the angular range required for arranging nine consecutive segments 15. Each second short-circuit member 16b, 16d, 16f, or 16h extends in an arcuate form in an angular range of 120 degrees. The angular range of 120 degrees corresponds to the angular range required for arranging eight consecutive segments 15.

Figure 3B:
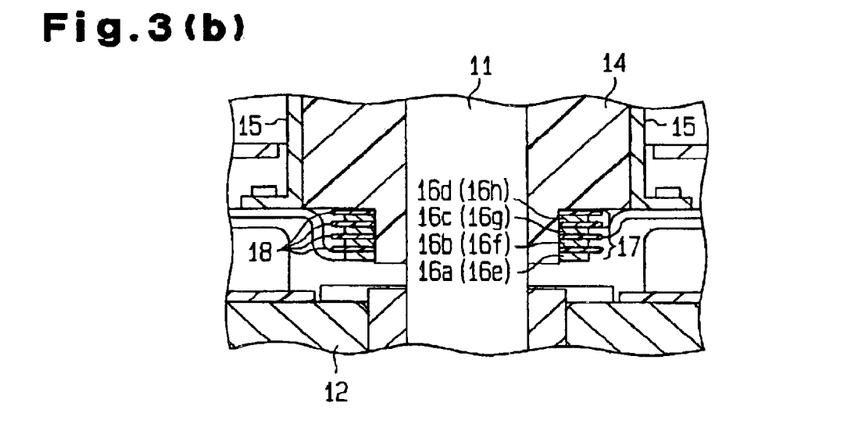
FIG. 3(b) is an enlarged partial cross-sectional view of the motor shown in FIG. 3(a)

The short-circuit members 16a to 16h are arranged about the axis of the commutator 14 and are displaced from each other by 45 degrees. As shown in FIGS. 1(a) and 3(b), the short-circuit members 16a to 16h are laminated to form a four-layer structure in the axial direction of the commutator 14. The short-circuit members 16a to 16h form a substantially cylindrical laminated body 17. That is, the first short-circuit member 16a and the first short-circuit member 16e are located in a first plane (first layer) that is perpendicular to the axis of the commutator 14. The second short-circuit member 16b and the second short-circuit member 16f are located in a second plane (second layer) that is perpendicular to the axis of the commutator 14. The first short-circuit member 16c and the first short-circuit member 16g are located in a third plane (third layer) that is perpendicular to the axis of the commutator 14. The second short-circuit member 16d and the second short-circuit member 16h are located in a fourth plane (fourth layer) that is perpendicular to the axis of the commutator 14. An insulating material 18 is located between two adjacent layers. The cylindrical laminated body 17 is coaxial with and is secured to the commutator 14 as shown in FIGS. 3(a) and 3(b). The laminated body 17 is located between the commutator 14 and the armature core 12. The rotary axis 11 extends through the laminated body 17.

As shown in FIG. 3(a), an anode supply brush 19a and a cathode supply brush 19b are located about the axis of the commutator 14 at angular intervals of 180 degrees and slide against the outer circumferential surface of the commutator 14. For example, when the anode supply brush 19a contacts the No. 1 segment 15 as shown in FIG. 1(a), the cathode supply brush 19b contacts the No. 13 segment 15, which is apart from the No. 1 segment 15 by 180 degrees. In this case, as shown in FIGS. 1(a) and 1(b), the anode supply brush 19a is connected to one end of the second exciting coil 13b and one end of the third exciting coil 13c via the No. 1 segment 15 and the short-circuit member 16a. The cathode supply brush 19b is connected to one end of the sixth exciting coil 13f and one end of the seventh exciting coil 13g via the No. 13 segment 15 and the short-circuit member 16e.

When electric current is supplied to each of the exciting coils 13a to 13h from each of the supply brushes 19a and 19b via the commutator 14, the armature 3 is rotated. According to the rotation, the segment 15 that contacts each supply brush 19a or 19b is switched, and the rotation of the armature 3 is continued.

The motor 1 according to the first embodiment provides the following advantages.

Twenty-four segments 15 of the commutator 14 are divided into eight segment groups, each of which includes three segments 15. Each of the first to eighth segment groups includes the first to third segments 15, which are arranged in order in the circumferential direction. Each of the first short-circuit members 16a, 16c, 16e, and 16g connects the first segment of the nth (n is an odd number) segment group, the third segment of the even number segment group that is adjacent to the nth segment group in the circumferential direction, and the third segment of the odd number segment group that is adjacent to the even number segment group in the circumferential direction. Each of the second short-circuit members 16b, 16d, 16f, and 16h connects the first segment of the mth (m is an even number) segment group, the second segment of the odd number segment group that is adjacent to the mth segment group in the circumferential direction, and the second segment of the even number segment group that is adjacent to the odd number segment group in the circumferential direction.

As a result, each of the first short-circuit members 16a, 16c, 16e, and 16g can be formed to have the circumferential length that corresponds to the angular range of 135 degrees, in other words, the angular range required for arranging nine consecutive segments 15. Also, each of the second short-circuit members 16b, 16d, 16f, and 16h can be formed to have the circumferential length that corresponds to the angular range of 120 degrees, in other words, the angular range required for arranging eight consecutive segments 15.

Therefore, two short-circuit members that do not overlap each other in the axial direction can be arranged in the same plane. That is, the first short-circuit member 16a and the first short-circuit member 16e are arranged in a first plane. The second short-circuit member 16b and the second short-circuit member 16f are arranged in a second plane. The first short-circuit member 16c and the first short-circuit member 16g are located in a third plane. The second short-circuit member 16d and the second short-circuit member 16h are located in a fourth plane. Accordingly, the eight short-circuit members 16a to 16h are arranged to form the laminated body 17, which has the four-layer structure. Therefore, as compared to a case where eight short-circuit members are simply laminated in the axial direction such that one short-circuit member is arranged in one layer, the number of layers of short-circuit members laminated in the axial direction is reduced. This reduces the axial dimension of the laminated body 17. Thus, the size of the motor 1 is reduced in the axial direction.

A second embodiment of the present invention will now be described with reference to FIG. 4. Like or the same reference numerals are given to those components that are like or the same as the corresponding components of the first embodiment shown in FIGS. 1(a) to 3(b) and detailed explanations are omitted.

Figure 4:
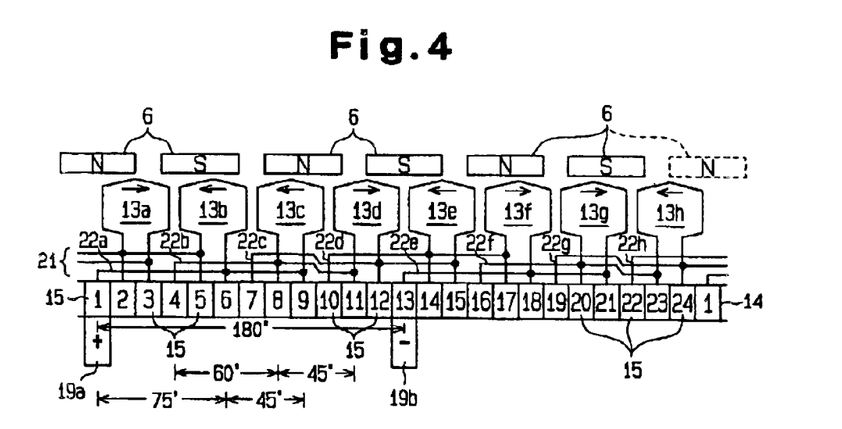
FIG. 4 is an exploded diagram illustrating a motor according to a second embodiment of the present invention.

Unlike the first embodiment, eight short-circuit members 22a to 22h form a laminated body 21 that has a three-layer structure in the second embodiment as shown in FIG. 4. The short-circuit members 22a to 22h of the second embodiment correspond to the short-circuit members 16a to 16h of the first embodiment, respectively. Each of the short-circuit members 22a to 22h connects three of the segments 15 in the same manner as the first embodiment. Also, the circumferential length of each of the short-circuit members 22a to 22h is the same as the first embodiment. That is, each of the first short-circuit members 22a, 22c, 22e, and 22g extends in a substantially arcuate form in the angular range of approximately 135 degrees to connect three segments 15 that are arranged at angular intervals of 75 degrees and 45 degrees. Each of the second short-circuit members 22b, 22d, 22f, and 22h extends in a substantially arcuate form in the angular range of approximately 120 degrees to connect three segments 15 that are arranged at angular intervals of 60 degrees and 45 degrees. The short-circuit members 22a to 22h are arranged about the axis of the commutator 14 displaced from each other by 45 degrees in the circumferential direction.

The short-circuit member 22a, which is connected to the first segment 15 of the first segment group, or the No. 1 segment 15, is arranged in a first layer of the laminated body 21. The short-circuit member 22d, which is connected to the first segment 15 of the fourth segment group, or the No. 10 segment 15, is arranged in a third layer of the laminated body 21. The short-circuit members 22a, 22d do not overlap each other in the axial direction.

The short-circuit member 22b, which is connected to the first segment 15 of the second segment group, or the No. 4 segment 15, has a first portion that axially overlaps with the short-circuit member 22a and a second portion that axially overlaps with the short-circuit member 22d. The short-circuit member 22c, which is connected to the first segment 15 of the third segment group, or the No. 7 segment 15, has a first portion that axially overlaps with the short-circuit member 22a in the same manner as the short-circuit member 22b and a second portion that axially overlaps with the short-circuit member 22d. Each of the short-circuit members 22b, 22c is bent between the first portion and the second portion so that the first portion and the second portion are offset in the axial direction. In other words, the short-circuit members 22b, 22c are bent between the short-circuit members 22a, 22d, or between the No. 9 segment 15 and the No. 10 segment 15. As a result, the first part of the short-circuit member 22b is arranged in a second layer of the laminated body 21, and the second portion of the short-circuit member 22b is arranged in the first layer of the laminated body 21. On the other hand, the first portion of the short-circuit member 22c is arranged in a third layer, and the second portion of the short-circuit member 22c is arranged in the second layer.

The short-circuit member 22e, which is connected to the first segment 15 of the fifth segment group, or the No. 13 segment 15, is arranged in the first layer of the laminated body 21. The short-circuit member 22h, which is connected to the first segment 15 of the eighth segment group, or the No. 22 segment 15, is arranged in the third layer of the laminated body 21. The short-circuit members 22e, 22h do not overlap each other in the axial direction.

The short-circuit member 22f, which is connected to the first segment 15 of the sixth segment group, or the No. 16 segment 15, has a first portion that axially overlaps with the short-circuit member 22e and a second portion that axially overlaps with the short-circuit member 22h. The short-circuit member 22g, which is connected to the first segment 15 of the seventh segment group, or the No. 19 segment 15, has a first portion that axially overlaps with the short-circuit member 22e in the same manner as the short-circuit member 22f and a second portion that axially overlaps with the short-circuit member 22h. Each of the short-circuit members 22f and 22g is bent between the first portion and the second portion so that the first portion and the second portion are offset in the axial direction. In other words, the short-circuit members 22f and 22g are bent between the short-circuit members 22e and 22h, or between the No. 21 segment 15 and the No. 22 segment 15. As a result, the first part of the short-circuit member 22f is arranged in the second layer of the laminated body 21, and the second portion of the short-circuit member 22f is arranged in the first layer of the laminated body 21. On the other hand, the first portion of the short-circuit member 22g is arranged in the third layer, and the second portion of the short-circuit member 22g is arranged in the second layer.

In the first embodiment, a space exists between two short-circuit members located in the same layer of the laminated body 17 as shown in FIG. 1(a). In the second embodiment, to minimize such space, some short-circuit members are bent such that part of the short-circuit members are arranged in a space between adjacent short-circuit members in different layer as shown in FIG. 4. As a result, although eight short-circuit members form the laminated body 17 that has the four-layer structure in the first embodiment, eight short-circuit members form the laminated body 21 that has the three-layer structure in the second embodiment. Thus, the axial dimension of the laminated body 21 is reduced from that of the first embodiment, which further reduces the axial size of the motor 1.

The short-circuit members 22a to 22h are classified into those that extend in the angular range of 135 degrees and those that extend in the angular range of 120 degrees. The short-circuit members that extend in the angular range of 135 degrees form a space corresponding to an angular range of 225 degrees (225°=360°−135°). The short-circuit members that extend in the angular range of 120 degrees form a space corresponding to an angular range of 240 degrees (240°=360°−120°). Therefore, when a laminated body having an eight-layer structure is formed by arranging each of the eight short-circuit members 22a to 22h in a different layer, the sum of the spaces of eight layers is 1860 degrees (1860°=225°×4 layer+240°×4 layer). When the short-circuit members are formed and arranged to fill spaces corresponding to 1860 degrees, the number of layers of the laminated body having the eight-layer structure is reduced by 5.2 layers (186°/360°). Thus, the laminated body 21 having the three-layer structure according to the second embodiment has a very small space between the adjacent short-circuit members in each layer. Therefore, the short-circuit members 22a to 22h are effectively arranged to reduce the axial dimension of the laminated body 21.

A third embodiment of the present invention will now be described with reference to FIG. 5. Like or the same reference numerals are given to those components that are like or the same as the corresponding components of the first embodiment shown in FIGS. 1(a) to 3(b) and detailed explanations are omitted.

Figure 5:
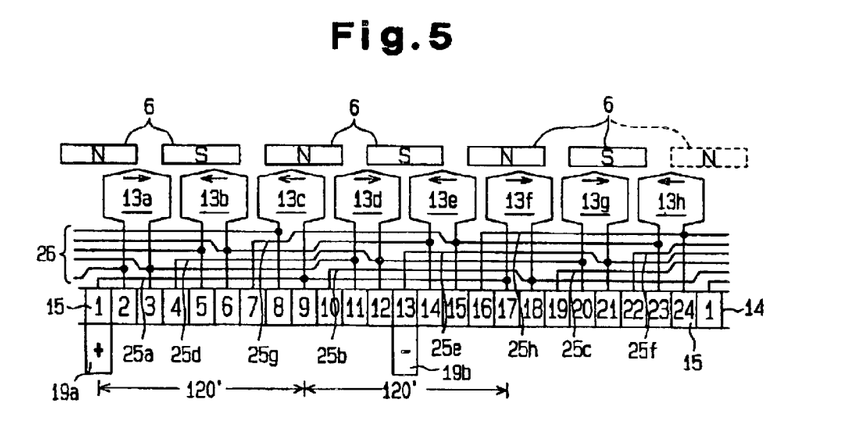
FIG. 5 is an exploded diagram illustrating a motor according to a third embodiment of the present invention.

As shown in FIG. 5, in the third embodiment, eight short-circuit members 25a to 25h are each formed to connect three segments 15 that are arranged at angular intervals of 120 degrees.

That is, the short-circuit member 25a connects the No. 1, No. 9, and No. 17 segments 15. The short-circuit member 25b connects the No. 10, No. 18, and No. 2 segments 15. The short-circuit member 25c connects the No. 19, No. 3, and No. 11 segments 15. The short-circuit member 25d connects the No. 4, No. 12, and No. 20 segments 15. The short-circuit member 25e connects the No. 13, No. 21, and No. 5 segments 15. The short-circuit member 25f connects the No. 22, No. 6, and No. 14 segments 15. The short-circuit member 25g connects the No. 7, No. 15, and No. 23 segments 15. The short-circuit member 25h connects the No. 16, No. 24, and No. 8 segments 15. Each of the short-circuit members 25a to 25h is formed by a metal plate and extends in an arcuate form in an angular range of approximately 255 degrees. The angular range of 255 degrees corresponds to the angular range required to arrange seventeen segments 15.

The short-circuit members 25a to 25h are arranged about the axis of the commutator 14 displaced from each other by 135 degrees. The short-circuit members 25a to 25h are laminated to form a six-layer structure in the axial direction of the commutator 14. The short-circuit members 25a to 25h form a substantially cylindrical laminated body 26. In the third embodiment also, as in the second embodiment of FIG. 4, some of the eight short-circuit members 25a to 25h are bent to be arranged in several layers of the laminated body 26. As a result, a space between adjacent short-circuit members in each layer of the laminated body 26 is reduced.

That is, the short-circuit member 25a, which is connected to the No. 1, No. 9, and No. 17 segments 15, is arranged in a first layer of the laminated body 26. The short-circuit member 25b, which is connected to the No. 10, No. 18, and No. 2 segments 15, has a first portion that is located at a portion of the first layer where the short-circuit member 25a does not exist and two second portions that are arranged in a second layer of the laminated body 26. The short-circuit member 25b is bent between the first portion and each second portion such that the first portion and the second portions are offset in the axial direction. The short-circuit member 25c, which is connected to the No. 19, No. 3, and No. 11 segments 15, has two first portions that are arranged at portions of the second layer where the short-circuit member 25b does not exist and two second portions that are arranged in a third layer of the laminated body 26. The short-circuit member 25c is bent between each first portion and each second portion such that the first portions and the second portions are offset in the axial direction. The short-circuit member 25d, which is connected to the No. 4, No. 12, and No. 20 segments 15, has two first portions that are arranged at portions of the third layer where the short-circuit member 25c does not exist and a second portion that is located in a fourth layer of the laminated body 26. The short-circuit member 25d is bent between each first portion and the second portion such that the first portions and the second portion are offset in the axial direction.

The short-circuit member 25e, which is connected to the No. 13, No. 21, and No. 5 segments 15, has a first portion that is located at a portion of the third layer where the short-circuit members 25c, 25d do not exist and two second portions that are arranged in a portion of the fourth layer where the short-circuit member 25d do not exist. The short-circuit member 25e is bent between the first portion and each second portion such that the first portion and the second portions are offset in the axial direction. The short-circuit member 25f, which is connected to the No. 22, No. 6, and No. 14 segments 15, has two first portions that are arranged at portions of the fourth layer where the short-circuit members 25d, 25e do not exist and two second portions arranged in a fifth layer of the laminated body 26. The short-circuit member 25f is bent between each first portion and each second portion such that the first portions and the second portions are offset in the axial direction. The short-circuit member 25g, which is connected to the No. 7, No. 15, and No. 23 segments 15, has two first portions arranged at portions of the fifth layer where the short-circuit member 25f does not exist and a second portion arranged in a sixth layer of the laminated body 26. The short-circuit member 25g is bent between each first portion and the second portion such that the first portions and the second portion are offset in the axial direction. The short-circuit member 25h, which is connected to the No. 16, No. 24, and No. 8 segments 15, is arranged in the sixth layer where the short-circuit member 25g does not exist.

Each of the short-circuit members 25a to 25h extends in the angular range of 255 degrees. Therefore, when a laminated body having an eight-layer structure is formed by arranging each of the eight short-circuit members 25a to 25h in a different layer, a space corresponding to an angular range of 105 degrees (105°=260°−255°) is formed in each layer. The sum of the spaces of the eight layers corresponds to 840 degrees (840°=105°×8 layers). When the short-circuit members are formed and arranged to reduce spaces corresponding to 840 degrees, the number of layers of the laminated body having the eight-layer structure can be reduced by 2.3 layers (2.3=840°/360°). Thus, the laminated body 26 having the six-layer structure according to the third embodiment has a very small space between the adjacent short-circuit members in each layer. Therefore, the short-circuit members 25a to 25h are effectively arranged to reduce the axial dimension of the laminated body 26.

As described above, in the third embodiment, eight short-circuit members form the laminated body 26 that has the six-layer structure. Therefore, the axial dimension of the laminated body 26 is reduced, which reduces the size of the motor 1 in the axial direction.

A fourth embodiment of the present invention will now be described with reference to FIG. 6. Like or the same reference numerals are given to those components that are like or the same as the corresponding components of the third embodiment shown in FIG. 5 and detailed explanations are omitted.

Figure 6:
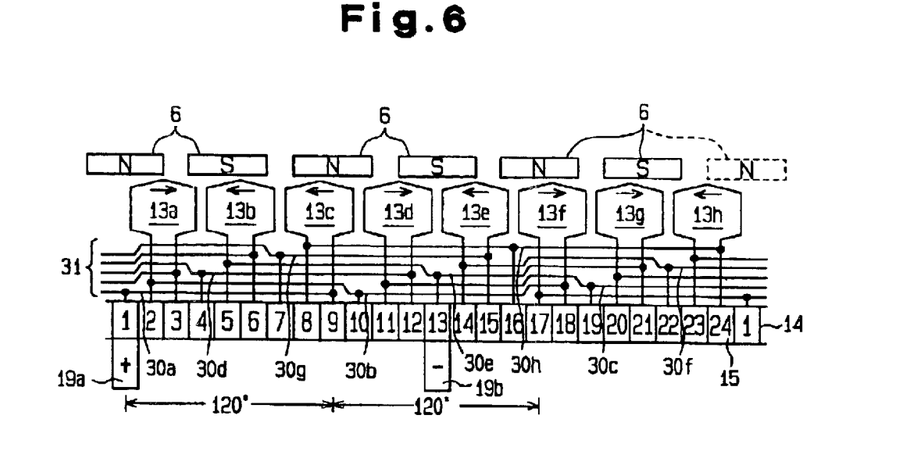
FIG. 6 is an exploded diagram illustrating a motor according to a fourth embodiment of the present invention.

As shown in FIG. 6, short-circuit members 30a to 30h of the fourth embodiment are each formed to connect three segments 15 that are arranged at angular intervals of 120 degrees as in the third embodiment of FIG. 5.

The short-circuit member 30a connects the No. 17, No. 1, and No. 9 segments 15. The short-circuit member 30b connects the No. 2, No. 10, and No. 18 segments 15. The short-circuit member 30c connects the No. 11, No. 19, and No. 3 segments 15. The short-circuit member 30d connects the No. 20, No. 4, and No. 12 segments 15. The short-circuit member 30e connects the No. 5, No. 13, and No. 21 segments 15. The short-circuit member 30f connects the No. 14, No. 22, and No. 6 segments 15. The short-circuit member 30g connects the No. 23, No. 7, and No. 15 segments 15. The short-circuit member 30h connects the No. 8, No. 16, and No. 24 segments 15. Each of the short-circuit members 30a to 30h is formed by a metal plate and extends in an arcuate form in an angular range of substantially 255 degrees.

The short-circuit members 30a to 30h are arranged about the axis of the commutator 14 displaced from each other by 135 degrees. The short-circuit members 30a to 30h are laminated to form a six-layer structure in the axial direction of the commutator 14. The short-circuit members 30a to 30h form a substantially cylindrical laminated body 31. In the fourth embodiment also, as in the third embodiment of FIG. 5, some of the eight short-circuit members 30a to 30h are bent to be arranged in several layers of the laminated body 31. As a result, a space between adjacent short-circuit members in each layer of the laminated body 31 is reduced.

The short-circuit member 30a, which is connected to the No. 17, No. 1, and No. 9 segments 15, is arranged in a first layer of the laminated body 31. The short-circuit member 30b, which is connected to the No. 2, No. 10, and No. 18 segments 15, has a first portion arranged at a portion of the first layer where the short-circuit member 30a does not exist and two second portions arranged in a second layer of the laminated body 31. The short-circuit member 30c, which is connected to the No. 11, the No. 19, and No. 3 segments 15, has two first portions arranged at a portion of the second layer where the short-circuit member 30b does not exist and two second portions arranged in a third layer of the laminated body 31. The short-circuit member 30d, which is connected to the No. 20, No. 4, and No. 12 segments 15, has two first portions arranged at portions of the third layer where the short-circuit member 30c does not exist and a second portion arranged in a fourth layer of the laminated body 31. The short-circuit member 30e, which is connected to the No. 5, No. 13, and No. 21 segments 15, has a first portion arranged at a portion of the third layer where the short-circuit members 30c, 30d do not exist and two second portions arranged at portions of the fourth layer where the short-circuit member 30d does not exist. The short-circuit member 30f, which is connected to the No. 14, No. 22, and No. 6 segments 15, has two first portions arranged at portions of the fourth layer where the short-circuit members 30d, 30e do not exist and two second portions arranged in a fifth layer of the laminated body 31. The short-circuit member 30g, which is connected to the No. 23, No. 7, and No. 15 segments 15, has two first portions arranged at portions of the fifth layer where the short-circuit member 30f does not exist and a second portion arranged in a sixth layer of the laminated body 31. The short-circuit member 30h, which is connected to the No. 8, No. 16, and No. 24 segments 15, is arranged in the sixth layer where the short-circuit member 30g does not exist.

Each of the short-circuit members 30b to 30g that is arranged in two layers are bent between the first portion and the second portion such that the first portion and the second portion are offset in the axial direction.

As described above, in the fourth embodiment also, as in the third embodiment of FIG. 5, eight short-circuit members form the laminated body 31 that has the six-layer structure. Therefore, the axial dimension of the laminated body 31 is reduced, which reduces the size of the motor 1 in the axial direction.

In the fourth embodiment, each of the short-circuit members 30a to 30h is arranged such that the first segment 15 of each of the first to eighth segment groups is arranged at the circumferential center of the corresponding short-circuit member 30a to 30h. In other words, each of the short-circuit members 30a to 30h is arranged such that each of the No. 1, No. 10, No. 19, No. 4, No. 13, No. 22, No. 7, and No. 16 segments, which are not connected to the exciting coils 13a to 13h, is arranged at the circumferential center of the corresponding short-circuit member 30a to 30h. That is, when three segments 15 connected to each other with each of the short-circuit members 30a to 30h are assumed to be a middle segment and side segments, which are arranged on both sides of the middle segment in the circumferential direction, the side segments are each connected to one of the exciting coils 13a to 13h.

In the third embodiment of FIG. 5, the No. 1, No. 10, No. 19, No. 4, No. 13, No. 22, No. 7, and No. 16 segments 15, which are not connected to the exciting coils 13a to 13h, are each arranged at the circumferential end portion of the corresponding short-circuit member 25a to 25h. In FIG. 5, the anode supply brush 19a contacts the No. 1 segment 15, and the cathode supply brush 19b contacts the No. 13 segment 15. In this state, in regard to the short-circuit member 25a, which is connected to the No. 1, No. 9, and No. 17 segments 15, the current density at a portion of the short-circuit member 25a from the No. 1 segment 15 to the No. 9 segment 15 is higher than the other portion. In regard to the short-circuit member 25e, which is connected to the No. 13, No. 21, and No. 5 segments 15, the current density of a portion of the short-circuit member 25e from the No. 13 segment 15 to the No. 21 segment 15 is higher than the other portion. Therefore, the cross-sectional areas of the short-circuit members 25a and 25e need to be increased at least at portions where the current density is high. The same is true of the remaining short-circuit members other than the short-circuit members 25a and 25e.

On the contrary, in the fourth embodiment, the segments 15 that are not connected to the exciting coils 13a to 13h are each arranged at the circumferential center of the corresponding short-circuit member 30a to 30h. In FIG. 6, the anode supply brush 19a contacts the No. 1 segment 15, and the cathode supply brush 19b contacts the No. 13 segment 15. In this case, electric current supplied to the No. 1 segment 15 from the anode supply brush 19a branches at the circumferential center of the corresponding short-circuit member 30a and equally flows toward the No. 9 segment 15 and the No. 17 segment 15. On the other hand, in regards to the short-circuit member 30e that corresponds to the No. 13 segment 15, electric current equally flows through a portion of the short-circuit member 30e that extends toward the No. 5 segment 15 from the circumferential center and a portion of the short-circuit member 30e that extends toward the No. 21 segment 15 from the circumferential center. Therefore, the current densities of the short-circuit members 30a and 30e are equalized, which minimizes the cross-sectional areas of the short-circuit members 30a and 30e. The same is true of other short-circuit members. Thus, the cross-sectional areas of all the short-circuit members 30a to 30h are minimized. For example, the thicknesses of the short-circuit members 30a to 30h are reduced. Therefore, in the fourth embodiment, the axial dimension of the laminated body 31 can be reduced than that of the third embodiment shown in FIG. 5.

In the fourth embodiment, the anode supply brush 19a and the cathode supply brush 19b need not be arranged at an angular interval of 180 degrees but may be arranged at an angular interval of 60 degrees or 300 degrees.

In the fourth embodiment, each short-circuit members 30a to 30h may connect three segments 15 that are not arranged at angular intervals of 120 degrees to each other. The number of poles of the stator 2 (the number of permanent magnets 6), the number of poles of the armature 3 (the number of exciting coils), the number of segments 15, and the number of the short-circuit members may be changed as required. The same is true of the third embodiment shown in FIG. 5.

It should be apparent to those skilled in the art that the present invention may be embodied in many other specific forms without departing from the spirit or scope of the invention. Particularly, it should be understood that the invention may be embodied in the following forms.

In the above embodiments, the short-circuit members are formed by metal plates, but arcuate wires may be used.

In FIG. 3(a), the laminated body 17 is secured to the commutator 14. However, the laminated body 17 may be located apart from the commutator 14. Also, the laminated body 17 is arranged between the commutator 14 and the armature core 12. However, the laminated body 17 may be arranged at any other position.

In the second to fourth embodiments, the angular width of each short-circuit member may be changed as required. Assume that the motor has the stator 2, the number of magnetic poles of which is 2x, the armature 3, the number of teeth of which (the number of exciting coils) is 2y, and the segments 15, the number of which is 2xy. When power is simultaneously supplied to segments, the number of which is B, by one brush, that is, when one short-circuit member connects the segments, the number of which is B, the minimum number A of the short-circuit members is 2xy/B. x is an integer number greater than or equal to 1, y is an integer number greater than or equal to three. In this case, the angular width of each short-circuit member is less than or equal to (360−360/A). This means that a space will be created in the circumferential direction corresponding to the angular width greater than or equal to 360/A degrees when a laminated body having a multiple-layer structure is formed by arranging each of the short-circuit members in different layers. Therefore, when the short-circuit members, the number of which is A, are displaced in the circumferential direction and laminated one by one to form a laminated body, the sum of the space becomes greater than or equal to 360 degrees. When the short-circuit members are formed and arranged to reduce the space, a laminated body, the number of layers of which is less than the number of the short-circuit members by one, can be formed. When the angular width of each short-circuit member becomes less than (360−360/A) degrees, the space increases. When the space is increased, the number of layers can be reduced.

In the above embodiments, the angular width of each short-circuit member may be set such that each circumferential end of the short-circuit member corresponds to the circumferential center of each segment to be connected. For example, in the first embodiment, the angular width of the first short-circuit members 16a, 16c, 16e, and 16g is set to 120 degrees, and the angular width of the second short-circuit members 16b, 16d, 16f, and 16h is set to 105 degrees. In the second embodiment also, the angular width of the first short-circuit members 22a, 22c, 22e, and 22g is set to 120 degrees, and the angular width of the second short-circuit members 22b, 22d, 22f, and 22h is set to 105 degrees. Also, the angular width of the short-circuit members 25a to 25h of the third embodiment, and the angular width of the short-circuit members 30a to 30h of the fourth embodiment are set to 240 degrees.

The present examples and embodiments are to be considered as illustrative and not restrictive and the invention is not to be limited to the details given herein, but may be modified within the scope and equivalence of the appended claims.

What is claimed is:

1. A motor comprising:
   a stator having a plurality of magnetic poles, wherein the number of the magnetic poles is represented by 2x (x is an integer number greater than or equal to one), and wherein the magnetic poles are arranged along the circumferential direction of the stator;
   a rotor facing the magnetic poles, wherein the rotor includes:
      an armature core having a plurality of teeth, wherein the number of the teeth is represented by 2y (y is an integer number greater than or equal to three), and wherein a coil is wound about each tooth;
      a commutator having a plurality of segments, wherein the number of the segments is represented by 2xy, and wherein the segments are arranged along the circumferential direction of the commutator; and
      a plurality of short-circuit members, wherein each short-circuit member is connected to a predetermined number of the segments, wherein the number of the segments that are connected to one short-circuit member is B, and wherein the number of the short-circuit members is at least 2xy/B; and
   an anode supply brush and a cathode supply brush, wherein the supply brushes slide against the commutator, and wherein the supply brushes are arranged at a predetermined angular interval about the axis of the commutator,
   wherein each short-circuit member extends in an arcuate form in an angular range corresponding to the arranging positions of the segments to be connected to the short-circuit member, and wherein the short-circuit members are laminated to form a multi-layer structure in the axial direction of the commutator, and form a substantially cylindrical laminated body, and
   wherein the short-circuit members are formed and arranged such that at least parts of two or more of the short-circuit members are in the same layer of the laminated body so that the number of layers of the laminated body is less than the number of short-circuit members.

2. The motor according to claim 1, wherein some of the short-circuit members are arranged across several layers of the laminated body.

3. The motor according to claim 2, wherein each of the short-circuit members that are arranged across several layers of the laminated body has a first portion and a second portion, wherein the first portion and the second portion are arranged in adjacent layers, and wherein each short-circuit member is bent between the first portion and the second portion such that the first portion and the second portion are offset in the axial direction of the laminated body.

4. The motor according to claim 1, wherein, when the number of the short-circuit members is represented by A, the angular width of each short-circuit member is less than or equal to 360°−360°/A.

5. The motor according to claim 1, wherein the number of magnetic poles is six, the number of teeth is eight, and the number of the segments is twenty-four, and wherein each short-circuit member connects a set of three segments to each other.

6. The motor according to claim 5, wherein the number of short-circuit member is eight, and wherein the angular width of each short-circuit member is less than or equal to 315 degrees.

7. The motor according to claim 6, wherein the angular width of each short-circuit member is 240 or 120 degrees.

8. The motor according to claim 5, wherein each set of three segments that are connected to one of the short-circuit members are arranged at angular intervals of 120 degrees.

9. The motor according to claim 5, wherein each set of three segments that are connected to one of the short-circuit members include a middle segment and side segments, the side segments being arranged on both sides of the middle segment, and wherein the side segments are each connected to one of the coils.

10. The motor according to claim 1, wherein the supply brushes are arranged at angular interval of 60, 180, or 300 degrees about the axis of the commutator.

11. A motor comprising:
   a stator having six magnetic poles, wherein the magnetic poles are arranged along one circumferential direction of the stator, and wherein the magnetic poles are arranged such that the magnetic poles that are adjacent to each other in the circumferential direction have different polarities;
   a rotor facing the magnetic poles, wherein the rotor includes:
      an armature core having eight teeth, wherein a coil is wound about each tooth;
      a commutator having twenty-four segments, wherein the segments are arranged in the circumferential direction of the commutator; and
      a plurality of short-circuit members, wherein each short-circuit member is connected to three of the segments; and
   an anode supply brush and a cathode supply brush, wherein the supply brushes slide against the commutator, and wherein the supply brushes are arranged at an angular interval of 180 degrees about the axis of the commutator,
   wherein the segments are classified into first to eighth segment groups in order along the one circumferential direction of the commutator, wherein each segment group includes first to third segments, and wherein each coil is connected to the second and third segments of one of the segment groups,
   wherein the short-circuit members include first short-circuit members and second short-circuit members, wherein each of the first short-circuit members is connected to the first segment of an odd number segment group, the third segment of an even number segment group that is adjacent to the odd number segment group in the one circumferential direction, and the third segment of an odd number segment group that is adjacent to the even number segment group in the one circumferential direction, and
   wherein each of the second short-circuit members is connected to the first segment of an even number segment group, the second segment of an odd number segment group that is adjacent to the even number segment group in the one circumferential direction, and the second segment of an even number segment group that is adjacent to the odd number segment group in the one circumferential direction.

12. The motor according to claim 11, wherein each of the short-circuit members extends in an arcuate form in an angular range corresponding to the arranging positions of three segments to be connected to the short-circuit member, wherein the short-circuit members are laminated to form a multi-layer structure in the axial direction of the commutator, and wherein the short-circuit members form a substantially cylindrical laminated body.

13. The motor according to claim 12, wherein the short-circuit members are formed and arranged such that the number of layers of the laminated body is less than the number of the short-circuit members.

14. The motor according to claim 12, wherein two short-circuit members that do not overlap each other in the axial direction are arranged in the same layer of the laminated body.

15. The motor according to claim 12, wherein a space exists between adjacent short-circuit members in the same layer of the laminated body, and wherein some of the short-circuit members are bent such that parts of the short-circuit members in different layer is arranged in the space.

16. The motor according to claim 12, wherein some of the short-circuit members are bent to be arranged across several layers of the laminated body.

17. The motor according to claim 16, wherein the short-circuit member connected to the first segment of the second segment group and the short-circuit member connected to the first segment of the third segment group are bent between the third segment of the third segment group and the first segment of the fourth segment group, and
   wherein the short-circuit member connected to the first segment of the sixth segment group and the short-circuit member connected to the first segment of the seventh segment group are bent between the third segment of the seventh segment group and the first segment of the eighth segment group.

* * * * *